United States Patent
Neumann et al.

(10) Patent No.: US 9,199,381 B2
(45) Date of Patent: Dec. 1, 2015

(54) PARALLEL-KINEMATICAL MACHINE WITH GIMBAL HOLDERS

(75) Inventors: Karl-Erik Neumann, Älvsjö (SE); Thomas Andersson, Täby (SE); Kristoffer Larsson, Göteborg (SE); Fredrik Palmquist, Danderyd (SE)

(73) Assignee: EXECHON EMIRATES AB, Sollentuna (SE)

( * ) Notice: Subject to any disclaimer, the term of this patent is extended or adjusted under 35 U.S.C. 154(b) by 260 days.

(21) Appl. No.: 13/704,762

(22) PCT Filed: Jun. 9, 2011

(86) PCT No.: PCT/SE2011/050709
§ 371 (c)(1),
(2), (4) Date: Dec. 17, 2012

(87) PCT Pub. No.: WO2011/159225
PCT Pub. Date: Dec. 22, 2011

(65) Prior Publication Data
US 2013/0087004 A1  Apr. 11, 2013

(30) Foreign Application Priority Data
Jun. 17, 2010  (SE) .................................... 1050623

(51) Int. Cl.
*B25J 18/02* (2006.01)
*B25J 17/02* (2006.01)
*B25J 9/00* (2006.01)

(52) U.S. Cl.
CPC .............. *B25J 18/025* (2013.01); *B25J 9/0063* (2013.01); *B25J 17/0266* (2013.01); *Y10T 74/20305* (2015.01); *Y10T 409/307672* (2015.01); *Y10T 409/309576* (2015.01)

(58) Field of Classification Search
CPC ........ B25J 9/003; B25J 17/02; B25J 17/0266; B25J 18/025

USPC ................ 74/490.01, 490.03, 490.05, 490.1; 901/15
See application file for complete search history.

(56) References Cited

U.S. PATENT DOCUMENTS

| 4,732,525 A | 3/1988 | Neumann |
| 5,987,726 A * | 11/1999 | Akeel ........................ 29/407.08 |

(Continued)

FOREIGN PATENT DOCUMENTS

| DE | 199 29 399 | 1/2000 |
| WO | WO 99/67066 | 12/1999 |
| WO | WO 2005/025816 | 3/2005 |
| WO | WO 2006/054935 | 5/2006 |
| WO | WO 2006/062466 | 6/2006 |

OTHER PUBLICATIONS

International Search Report for PCT/SE2011/050709, mailed Sep. 29, 2011.

(Continued)

*Primary Examiner* — William C Joyce
(74) *Attorney, Agent, or Firm* — Nixon & Vanderhye P.C.

(57) ABSTRACT

A parallel-kinematical machine (20) that includes three setting devices (24.1, 24.2, 24.3) each of which can be lengthened and shortened individually, wherein each setting device (24.1, 24.2, 24.3) is connected to a first, a second and a third respective inner gimbal ring (23.1, 23.2, 23.3) of universal gimbal joints (UGJ) and that each inner gimbal ring (23.1, 23.2, 23.3) is mounted in bearings (25, 26, 27) for rotation in gimbal holders (21, 22) which are rotationally mounted in outer gimbal bearings (28, 29, 39) in an outer mounting (290) wherein the first inner gimbal ring (23.1) and the third inner gimbal ring (23.3) are mounted for rotation in a common outer gimbal holder (21) which is mounted for rotation about a common gimbal axis (32, 52) and in that the second inner gimbal ring (23.2) is mounted for rotation in a single gimbal holder (22) which is mounted in two opposite bearings for rotation about a second gimbal axis (31, 51) which is not aligned with said common gimbal axis (32, 52).

14 Claims, 5 Drawing Sheets

(56) References Cited

U.S. PATENT DOCUMENTS 6,240,799 B1 * 6/2001 Yau .............................. 74/490.03
7,673,384 B2 * 3/2010 O'Connell et al. ............. 29/787
8,225,692 B2 * 7/2012 Kock et al. ................. 74/490.03
8,783,127 B2    7/2014 Neumann

OTHER PUBLICATIONS

Written Opinion of the International Searching Authority for PCT/SE2011/050709, mailed Sep. 29, 2011.

U.S. Appl. No. 11/719,117 of Neumann, filed Mar. 4, 2009.

* cited by examiner

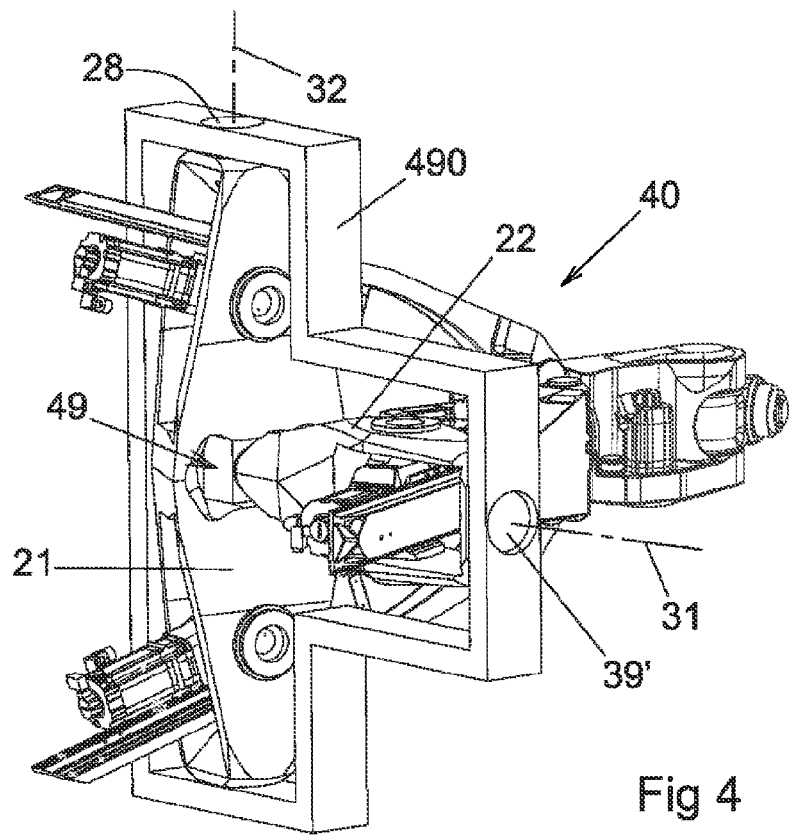
Fig 4
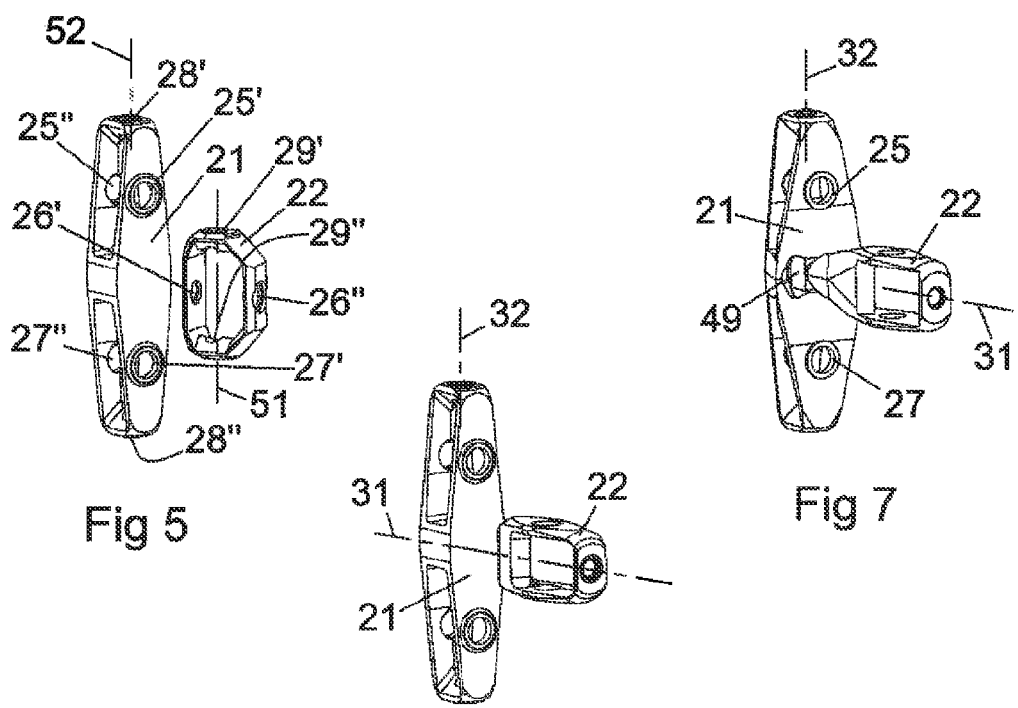
Fig 5
Fig 6
Fig 7

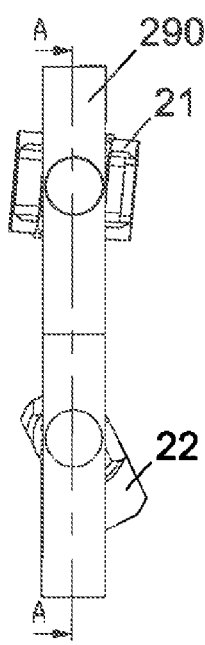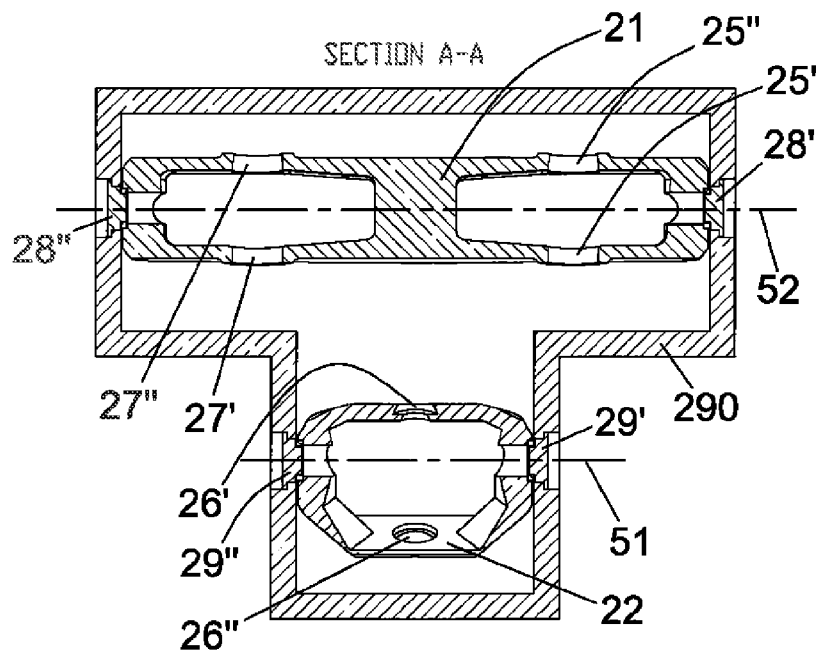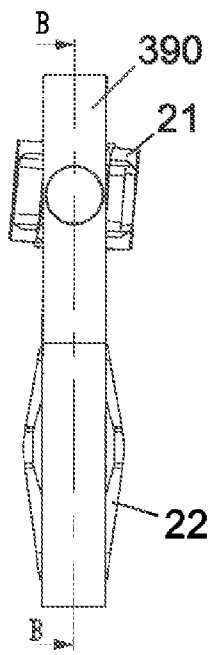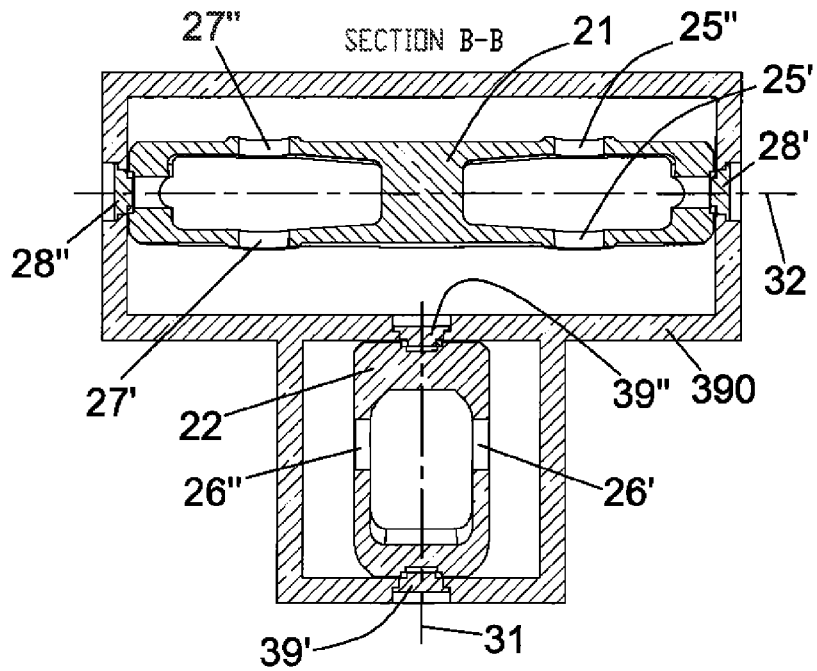

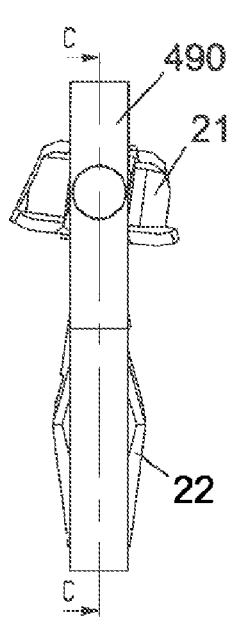
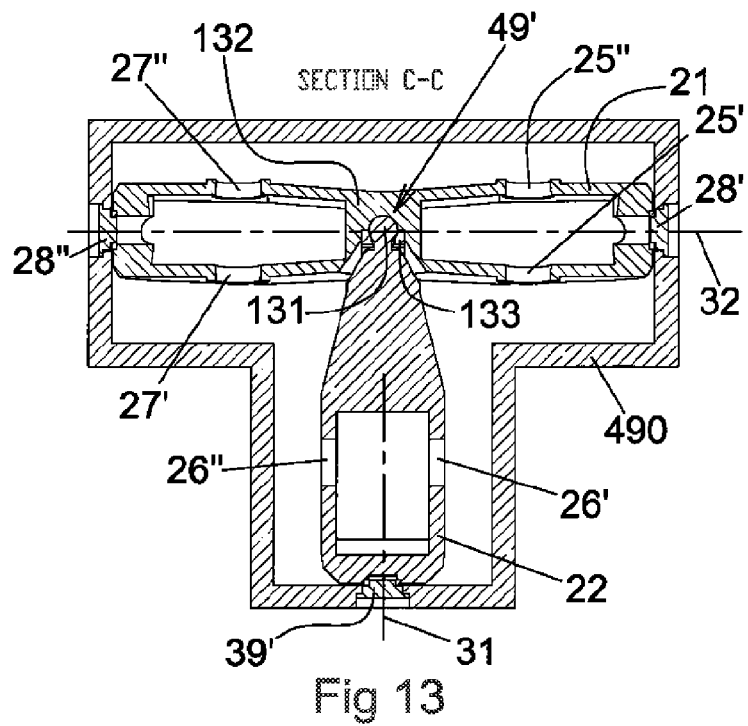
Fig 12
Fig 13
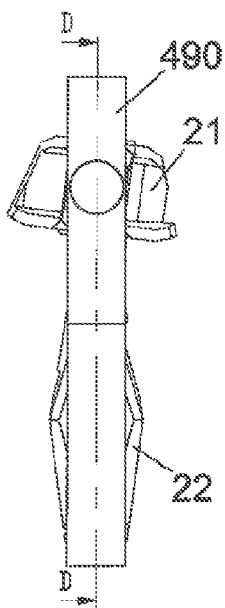
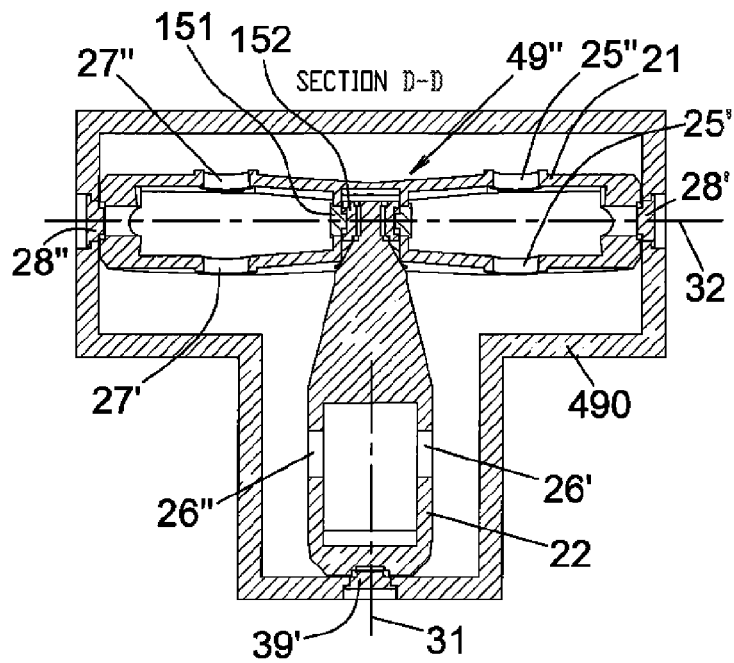
Fig 14
Fig 15

PARALLEL-KINEMATICAL MACHINE WITH GIMBAL HOLDERS

This application is the U.S. national phase of International Application No. PCT/SE2011/050709, filed 9 Jun. 2011, which designated the U.S. and claims priority to SE Application No. 1050623-6, filed 17 Jun. 2010, the entire contents of each of which are hereby incorporated by reference.

TECHNICAL FIELD

The present invention relates to the field of machine tools and robotics and then particularly to parallel-kinematical machines intended for work in the industry and their gimbal holders.

BACKGROUND OF THE INVENTION

WO 2006/054935 discloses a parallel-kinematical machine to which type the present invention relates. The disclosed parallel-kinematical machine in this document includes three setting devices which can be lengthened and shortened individually in order to move a positioning head. Each of the three setting devices is connected to the positioning head via a first joint. Furthermore, each setting device is connected to a base via a universal joint. The positioning head is movable within a working range in response to manoeuvring of the setting devices.

The base disclosed in the said prior art document is designed as a fixed block unit in which each of the three universal joints for each setting device is mounted. This base, also known as the upper platform, is complicated to produce as well as difficult to machine in order to get the correct tolerances in each of the seating of each universal joint which is rather costly. This base is also very heavy and is therefore subjected to high transporting costs and requires an accurate mounting in the location where the machine is to be placed. Also the end user of such a machine which is provided with this base must arrange for incorporation of this base into his production system which might be difficult due to the volume and the weight of the base.

The accuracy of the movements of this type of machines depends greatly on its rigidity, which, in turn, depends on the number of bearings/degrees of freedom available and also on the ability of the component materials to minimise torsional stresses and bending stresses in critical directions. In the disclosed parallel-kinematical machine each base mounted universal joint requires machined surfaces in the base which surfaces requires high tolerances in order for the machine to gain the required rigidity. Thus, it is very difficult to manufacture a casted base for such a machine when it comes to tolerances that are needed for the machine. The known machine base is also provided with a central hole through which cables have to come through which hole also weakens such a base.

OBJECT OF THE INVENTION

One object of the present invention is to provide a parallel-kinematical machine with reduced weight.

A further object is to provide a parallel-kinematical machine which also is more cost efficient than previously known machines.

A further object is also to make such a machine easier to manufacture. Also an object of the present invention is to provide a parallel-kinematical machine having increased overall stiffness which thus makes it possible to gain higher tolerances in machining than prior art machines.

One object of the present invention is to provide a gimbal holder of a parallel-kinematical machine whose rigidity and therewith its desired accuracy, is increased in comparison with that of earlier known parallel-kinematical machines. This is achieved in combination with a simple construction that contributes towards relatively low manufacturing costs.

A further object is also to connect the gimbal holder of a first setting device with the gimbal holder of a third setting device to each other to avoid individual twist of these setting devices during operation, resulting in substantially increased stiffness.

A further object is to provide such a gimbal holder that is lighter and therewith also contribute to the achievement of a simple construction and relatively low manufacturing costs.

In conjunction, another object is to provide gimbal holders of such a parallel-kinematical machine which is adapted for mounting requirements of an end user.

DISCLOSURE OF THE INVENTION

These objects are achieved by means of the present invention as defined in the accompanying independent patent claim. Suitable further embodiments of the invention will be apparent from the accompanying dependent patent claims.

The invention relates to a parallel-kinematical machine that includes three setting devices which can be lengthened and shortened individually in their longitudinal directions, wherein each setting device in one end is connected to a positioning head via a first joint. Each setting device is connected to a first, a second and a third respective inner gimbal ring of universal gimbal joints. Each inner gimbal ring is mounted in bearings for rotation in outer gimbal rings which are rotationally mounted in outer gimbal bearings in an outer mounting. This outer mounting is disclosed in the description and together with its figures as a mounting frame but this frame is only indicated as locations for gimbal holder (outer gimbal rings) bearings. These locations are to be provided by the end user of the machine and can be arranged in numerous ways as long as the positions of the bearings are maintained. The positioning head is hereby movable within a working range in response to manoeuvring of the setting devices. The machine is provided with at least two reinforcing beams which are each connected to the positioning head via a respective beam rotation bearing each having solely one degree of freedom. Each reinforcing beam is adapted to slide longitudinally in a beam bearing in the said respective universal gimbal joints when one or more of the setting devices are lengthened or shortened. Each beam bearing is connected to the gimbal holder via a beam-universal-joint and wherein the beam bearing of at least one reinforcing beam is rotatable about an axis that extends parallel with the longitudinal axis of said reinforcing beam. The first inner gimbal ring and the third inner gimbal ring are rotatably mounted about parallel axes in the respective outer gimbal rings. And in that the respective outer gimbal rings are connected into a common gimbal holder which is mounted for rotation about a common gimbal axis and in that the second inner gimbal ring is mounted in a single gimbal holder which is mounted in two opposite bearings for rotation about a single gimbal axis which is not aligned, i.e. not having a common rotational axis, with said common gimbal axis.

In an embodiment of the invention the said second gimbal axis is oriented approximately parallel to said common gimbal axis.

In an embodiment of the invention the said single gimbal axis of the single gimbal holder is oriented approximately perpendicular to said common gimbal axis and that at least one of said bearings of the single gimbal holder is located in the outer mounting.

In an embodiment of the invention both bearings of the single gimbal holder are located in the outer mounting.

In an embodiment of the invention one bearing of the single gimbal holder is located in the outer mounting and the other bearing of the single gimbal holder is located in the common gimbal holder at a location between the bearings of the first inner gimbal ring and the bearings of the third inner gimbal ring. In an embodiment of the invention said other bearing of the single gimbal holder is provided as a ball-joint bearing in the common gimbal holder.

In an embodiment of the invention said other bearing of the single gimbal holder is provided as a universal joint bearing having an inner bearing holder and an outer bearing holder in the common outer gimbal holder so that the single gimbal holder is mounted to the common gimbal holder with two degrees of freedom between the said bearing holders.

In an embodiment of the invention each reinforcing beam has in a first direction a flexural rigidity which is considerably greater than its flexural rigidity in a direction at right angles to said first direction.

In an embodiment of the invention each reinforcing beam has a generally rectangular cross-sectional shape.

The detailed embodiments described below include three setting devices, each of which is connected to its respective reinforcing beam, wherein the second reinforcing beam can slightly rotate about its longitudinal axis. Embodiments in which the second setting device is provided with an additional reinforcing beam can also be recognised within the scope of the present invention.

As will be evident from the illustrated embodiments, the first joint is given only one degree of freedom, therewith giving the machine its rigidity.

Each reinforcing beam is adapted to present in a first direction a bending resistance that greatly exceeds its bending resistance in a direction at right angles to the first direction. This enables the reinforcing beam to have a generally rectangular cross-sectional shape or an elliptical cross-sectional shape. It will be understood, however, that other cross-sectional shapes are conceivable within the scope of the invention, such as I-beams, for instance. The reinforcing beam will preferably be made of a composite material reinforced with carbon fibres.

The machine according to the embodiment shown in detail includes three setting devices, each of which is permanently connected to a reinforcing beam at said first joint. As is indicated above one of the setting devices can also be provided with an additional reinforcing beam with the intention of obtaining generally the same rigidity in all directions as is disclosed in the prior art reference. As indicated above, the machine may conceivably be provided with solely two reinforcing beams positioned at right angles to one another. The beam bearing of at least one reinforcing beam is slightly rotatable about its own longitudinal axis or about an axis in its gimbal holder parallel with said own longitudinal axis.

Each setting device of the illustrated embodiment is comprised of a screw-nut-mechanism whose nut is permanently connected to the inner gyro element. It will be understood, however, that other machine designs having other types of setting devices are fully conceivable within the scope of the invention. For example, linear motors may be used as setting devices instead of the illustrated screw-nut-mechanism. Such a linear motor may even consist of the reinforcing beam or comprise a part thereof.

Each reinforcing beam may includes at least one longitudinally extending first slide element, for example a steel slide bar which may be glued and firmly screwed to the beam, said first slide element being connected in a shape-locked fashion to but slideably in relation to a second slide element, for instance a guide rail, which is connected to the nut, either directly or indirectly, via an intermediate bearing. In the case when the second slide element is connected to the nut indirectly via an intermediate bearing, the second slide element is guided relative to the nut in a shape-wise fashion by virtue of being able to tilt around the setting device.

The screw or the nut is rotatably driven by a setting device motor. When it is the screw that is driven by the motor, the motor is connected to one end of the screw, whereas the other end of said screw is supported by a support bearing. In the case of the embodiment shown in detail, the setting device motor is mounted in a motor holder whose one end is provided with one part of said first joint and which also includes connection surfaces against which one or more reinforcing beams is/are intended to be fastened. The motor holder holding the setting device motor may alternatively be mounted at the other end of the screw in relation to what is shown, wherewith the "motor-free" end of the screw is connected to the first joint in this case. When it is the nut that is driven by the motor, the drive can be effected, for instance, via a belt drive or the like so that the ratio of the setting device to the motor can be readily changed.

Two of the first joints at the positioning head include mutually parallel joint axes whereas the third of said first joints at said positioning head includes a joint axis that extends at right angles to the other two. In addition, the inner gyro axis of the universal joint of each setting device is parallel with the joint axis of the first joint of the setting device in respect of those joints that do not allow tilting, i.e. rotation of the reinforcing beam about an axis parallel with its own symmetrical longitudinal axis in the joint.

The embodiment shown in detail provides a parallel-kinematical machine whose universal joints include two joints that each has two degrees of freedom and one joint that has three degrees of freedom, and only one degree of freedom with regard to each of the beam rotational bearings of the machine, i.e. at the positioning head.

It will be understood that the number of reinforcing beams provided and their cross-sectional dimensions can be varied in accordance with the invention. It will also be understood that the number of degrees of freedom of the first joint, i.e.

the setting device joint in respect of the positioning head, may be varied provided that the beam rotational bearing is not common with the first joint.

BRIEF DESCRIPTION OF THE DRAWINGS

The invention will now be described in more detail with reference to an exemplifying embodiment thereof illustrated in the accompanying drawings, in which

FIG. 4 illustrates a parallel-kinematical machine according to a third embodiment of the invention;

FIG. 5 illustrates the gimbal holders of the machine according to the first embodiment disclosed in FIG. 2;

FIG. 6 illustrates the gimbal holders of the machine according to the second embodiment disclosed in FIG. 3;

FIG. 7 illustrates the gimbal holders of the machine according to the third embodiment disclosed in FIG. 4;

FIG. 8 illustrates a side view of the gimbals mounting frame of the first embodiment disclosed in FIG. 2;

FIG. 9 disclose section A-A in FIG. 8;

FIG. 10 illustrates a side view of the gimbals mounting frame of the second embodiment disclosed in FIG. 3;

FIG. 11 disclose section B-B in FIG. 10;

FIG. 12 illustrates a side view of the gimbals mounting frame of the third embodiment disclosed in FIG. 4;

FIG. 13 disclose section C-C in FIG. 12;

FIG. 14 illustrates a side view of the gimbals mounting frame of an alternative gimbals mounting frame of the third embodiment disclosed in FIG. 4;

FIG. 15 disclose section D-D of the alternative gimbals mounting frame in FIG. 14;

DESCRIPTION OF THE INVENTION

In order to more clearly describe the present invention a prior art machine will be described in FIG. 1 and from such a machine the present invention has been developed. Thus, for a basic understanding of the machine according to the present invention reference is made to this prior art machine. The terminology used when describing this prior art machine is slightly different than that used when describing the embodiments according to the present invention. Furthermore, this prior art machine contains several corresponding components which are also present in the present invention embodiments as can be recognised from the attached figures.

Figure 1:
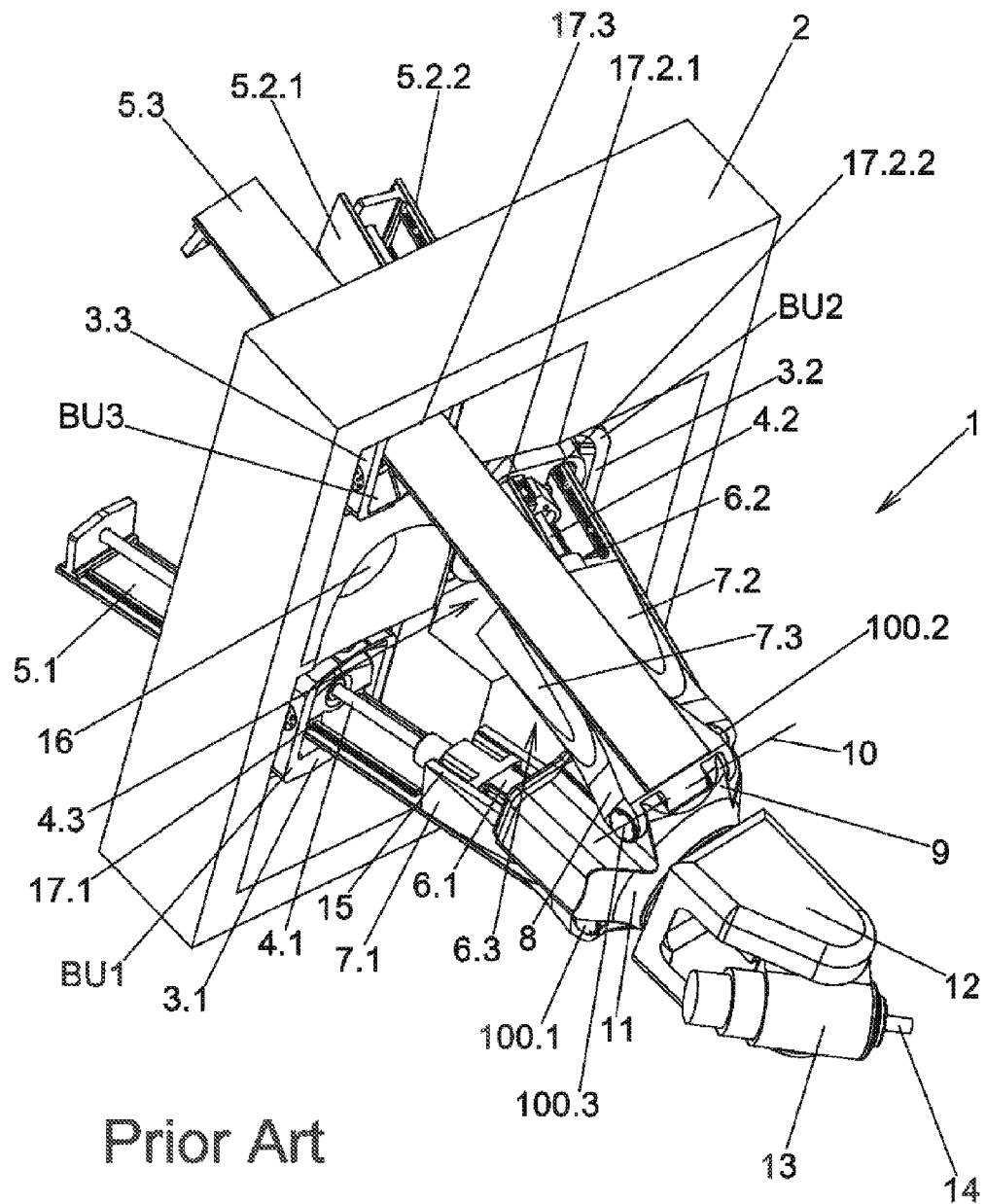
FIG. 1 illustrates a parallel-kinematical machine according to the indicated prior art.

FIG. 1 illustrates a prior art parallel-kinematical machine 1. The machine includes a base 2 in which three separate universal joints 3.1, 3.2, 3.3 are mounted in three corresponding through-penetrating openings in the base. Extending through each universal joint is a setting device 4.1, 4.2, 4.3 and one or two reinforcing beams 5.1, 5.2.1, 5.2.2, 5.3. When the universal joint relating to the setting device is not coincidental with the universal joint relating to the reinforcing beam, the universal joint of the reinforcing beam called the beam universal joint is referenced BU1, BU2, BU3. The setting device has the form of a screw-nut-mechanism whose nut is rigidly connected to the universal joint. The setting device screw is driven by a setting motor 6.1, 6.2, 6.3 mounted in a motor holder 7.1, 7.2, 7.3 which, in turn, is provided at its end with one part 8 of a first joint that co-acts with the other part 9 of the joint for rotation about a first joint axis 10. The other part 9 of the first joint is rigidly connected to a positioning head 11. The first joint 8, 9, 10 of the FIG. 1 embodiment thus functions as a beam rotational bearing 100.3 in respect of the third reinforcing beam 5.3 and, in this case, acts as a hinge that has only one degree of freedom. Other motor holders 7.1, 7.2 are connected correspondingly to the positioning head, via an individual beam rotational bearing 100.1, 100.2. The positioning head 11 is then connected typically to a manoeuvring head 12, a tool head 13, and a tool attachment means 14, for movement of a tool within the working range of the machine. The motor holder 7.1, 7.2, 7.3 also includes on two opposite sides connecting surfaces 15 against which the reinforcing beams 5.1, 5.2.1, 5.2.2, 5.3 are fastened. As will also be seen from FIG. 1, the base is provided with a media window 16 for the accommodation of cables and the like.

Each reinforcing beam 5.1, 5.2, 5.3 is arranged for transversal sliding movement in a beam bearing 17.1, 17.2.1, 17.2.2, 17.3 in the base 2 when lengthening or shortening the setting device 4.1, 4.2, 4.3. The beam bearing 17.1, 17.2.1, 17.2.2, 17.3 according to the FIG. 1 embodiment is arranged in the beam-universal joint BU1, BU2, BU3 that coincides with the universal joints 3.1, 3.2, 3.3 of respective setting devices.

As will be seen from FIG. 1, one of the setting devices, the second setting device 4.2, includes two reinforcing beams 5.2.1, 5.2.2, which are placed on a respective side of the setting device connected to said beams, and orientated generally at right angles to the remaining two reinforcing beams 5.1, 5.3 at the two other setting devices 4.1, 4.3. As a result of this reinforcing beam duplication, all reinforcing beams in the machine may be given the same dimensions and will take-up forces of equally large magnitudes.

Figure 2:
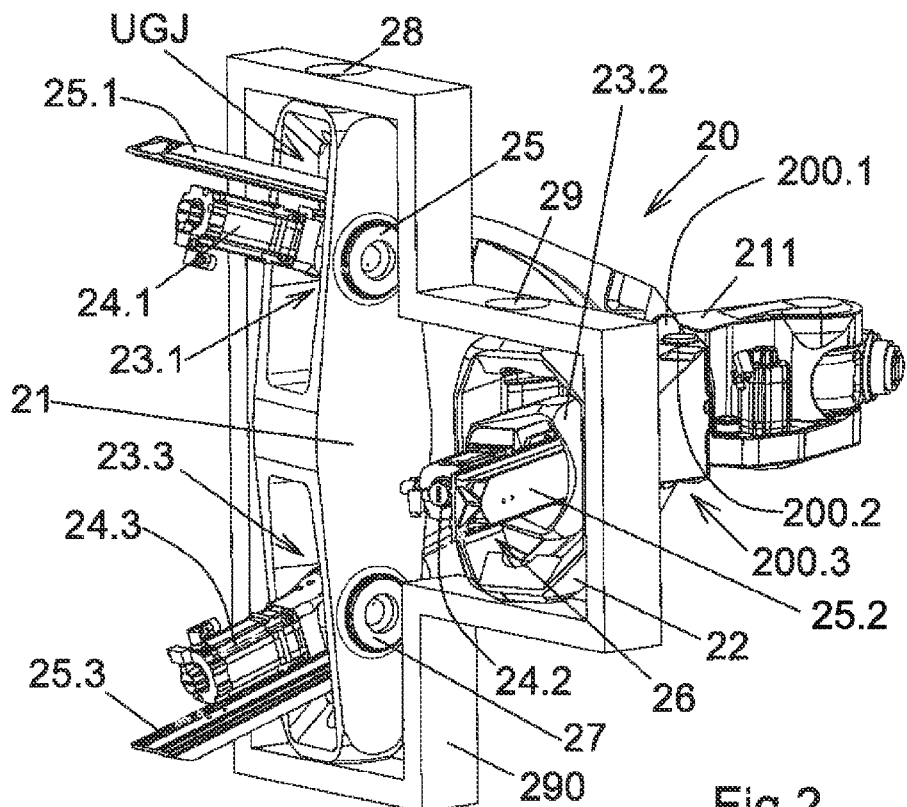
FIG. 2 illustrates a parallel-kinematical machine according to a first embodiment of the invention.

FIG. 2 shows a first embodiment of the invention; a parallel-kinematical machine 20 which includes three setting devices 24.1, 24.2, 24.3 each with a motor and a screw-and-nut mechanism which cooperates with inner gimbal parts of a universal gimbal joint in the machine. The setting devices can be lengthened and shortened individually. Each setting device 24.1, 24.2, 24.3 is in one end connected to a positioning head 211 via a first joint 200.1, 200.2, 200.3 wherein each setting device 24.1, 24.2, 24.3 is connected to a first, a second and a third respective inner gimbal ring 23.1, 23.2, 23.3 of universal gimbal joints UGJ. Each inner gimbal ring 23.1, 23.2, 23.3 is mounted in bearings 25, 26, 27 for rotation in gimbal holders 21, 22 which are rotationally mounted in outer gimbal bearings 28, 29 in an outer mounting 290. The term "bearing" is used in the following for both the bearing itself and for the seat of the bearing. The positioning head 211 is movable within a working range in response to manoeuvring of the setting devices 24.1, 24.2, 24.3. At least two reinforcing beams 25.1, 25.2, 25.3 are each connected to the positioning head 211 via the respective first joint 200.1, 200.2, 200.3, each having solely one degree of freedom. Each reinforcing beam 25.1, 25.2, 25.3 is adapted to slide longitudinally in a beam bearing in the said respective universal gimbal joints UGJ when one or more of the setting devices 24.1, 24.2, 24.3 are lengthened or shortened. Each beam bearing is connected to a gimbal holder 21, 22 and the beam bearing of at least one reinforcing beam 25.2 is rotatable about an axis that extends parallel with the longitudinal axis of said reinforcing beam 25.2. The first inner gimbal ring 23.1 and the third inner gimbal ring 23.3 are rotatable mounted about parallel axis in one and the same gimbal holder 21. Thus in the present invention the previously outer gimbal rings of the first and the third setting device and the first and the third reinforcing beam are connected into a common gimbal holder 21 which is mounted for rotation about a common gimbal axis in the common gimbal bearing 28. The second inner gimbal ring 23.2 is provided for rotation in a single gimbal holder 22 which is mounted in two opposite outer gimbal bearings 29 for rotation about a second gimbal axis which is not aligned with said common gimbal axis. Instead in the embodiment disclosed in FIG. 2 the gimbal axis of the gimbal holders 21, 22 is parallel or approximately parallel to each other and extends through the outer gimbal bearings 28, 29.

Figure 3:
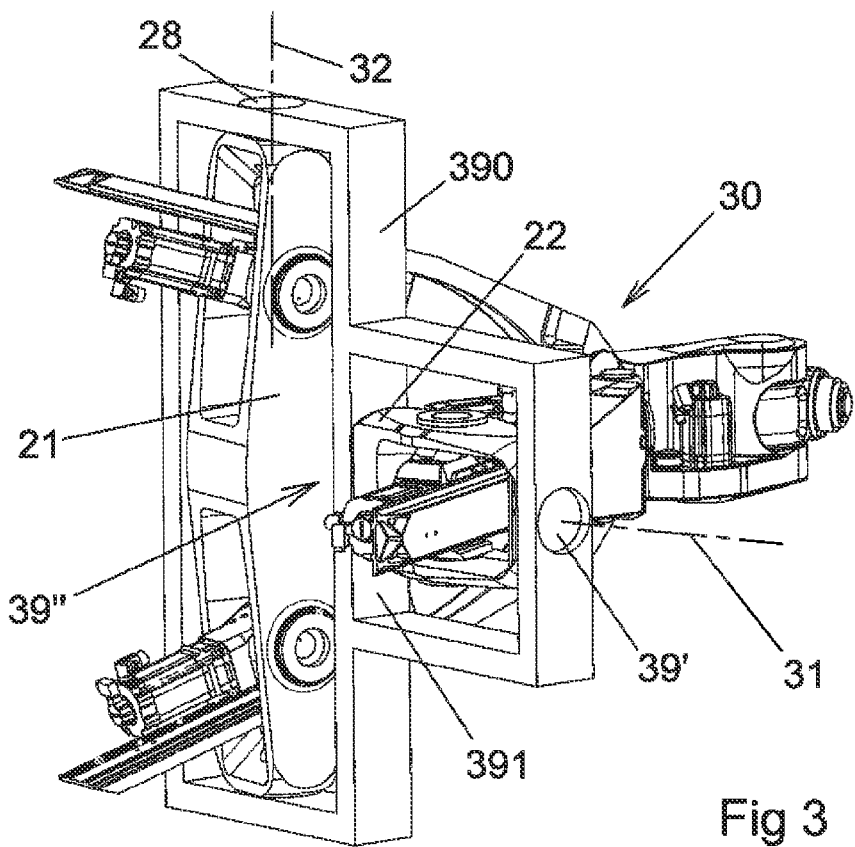
FIG. 3 illustrates a parallel-kinematical machine according to a second embodiment of the invention.

FIG. 3 shows a second embodiment of the invention in which the parallel-kinematical machine 30 comprises corresponding parts as described in FIG. 2 except for that the orientation of the second gimbal axis 31 of the outer gimbal bearings 39' of the single gimbal holder 22 is perpendicular or approximately perpendicular to the common gimbal axis 32 of the outer gimbal bearing 28 of the common gimbal holder 21. As can be seen in FIG. 3, the outer mounting 390 of this second embodiment will be slightly rearranged due to the different orientation of the second gimbal axis 31 in that an extra part 391 of the outer mounting is required for one of the outer gimbal bearings 39" on the second gimbal axis 31.

FIG. 4 shows a third embodiment of the invention in which the parallel-kinematical machine 40 comprises corresponding parts as described in FIG. 2 except for that the orientation of the second gimbal axis 31 of the outer gimbal bearings 39 is perpendicular or approximately perpendicular to the common gimbal axis 32 of the outer gimbal bearing 28 of the common gimbal holder 21. In this third embodiment seen in FIG. 4 the first outer gimbal bearing 39' of the single gimbal holder 22 is mounted in the outer mounting 490 while the second outer gimbal bearing 49 is mounted in the common gimbal holder 21.

As can be seen in the figures the first and the second embodiment require four external mountings in an outer mounting and the third embodiment requires only three external mountings in an outer mounting.

FIG. 5 shows the two gimbal holders of the first embodiment in FIG. 2, the common gimbal holder 21 and the single gimbal holder 22. As have been indicated in FIG. 2 the common gimbal holder 21 is provided with a first outer gimbal bearing 28' and a second outer gimbal bearing 28" to be attached to external mountings, for example in an outer mounting frame as previously disclosed. The common gimbal holder 21 is also provided with the first and second respective bearings 25', 25", 27', 27" to which bearings inner gimbal rings for the setting devices and their reinforcing beams are mounted. Also the single gimbal holder 22 is provided with a first outer gimbal bearing 29' and a second outer gimbal bearing 29" attachable to an external outer mounting as described. The rotation axis 51 of the single gimbal holder 22 is parallel or approximately parallel to the rotation axis 52 of the common gimbal holder 21 as also is disclosed in FIG. 2. The single gimbal holder 22 is also provided with first and second bearings 26', 26" for the inner gimbal ring of the second setting device and its reinforcing beam. As can be seen in both FIG. 2 and FIG. 5 the bearings 25', 25", 26', 26", 27', 27" for the inner gimbal rings are perpendicular to the outer gimbal bearings 28', 28", 29', 29" in order to form an universal joint.

FIG. 6 shows the two gimbal holders 21, 22 of the second embodiment in FIG. 3. In this embodiment the inner bearings for the inner gimbal rings are located in the gimbal holders in the same way as described in FIG. 5 but the orientation of the rotation axis 31 of the single gimbal holder 22 is perpendicular or approximately perpendicular to the rotation axis 32 of the common gimbal holder 21 as also is disclosed in FIG. 3.

FIG. 7 shows the two gimbal holders 21, 22 of the third embodiment disclosed in FIG. 4. Also in this embodiment the inner bearings for the inner gimbal rings are located in the gimbal holders in the same way as described in FIG. 5 with the orientation of the rotation axis 31 of the single gimbal holder 22 being perpendicular or approximately perpendicular to the rotation axis 32 of the common gimbal holder 21 as in FIG. 6 and also disclosed in FIG. 4. However, as is disclosed in FIG. 4, the second outer gimbal bearing 49 of the single gimbal holder 22 is mounted in the common gimbal holder 21 between and at equal distance to the bearings 25, 27 of the inner gimbal rings of the common gimbal holder 21.

FIG. 8 shows a side view of the mounting frame 290 together with its common gimbal holder 21 and its single gimbal holder 22 of the first embodiment in FIG. 2.

FIG. 9 shows a section A-A through the frame 290 and the gimbal holders 21, 22 as indicated in FIG. 8. In this section it can clearly be seen that the rotational axis 52 of the common gimbal holder 21 is parallel or approximately parallel to the rotational axis 51 of the single gimbal holder 22. Disclosed are also the bearings 25', 25", 27', 27" for the inner gimbal rings of the common gimbal holder 21 and the bearings 26', 26", for the inner gimbal ring of the single gimbal holder 22. The first outer gimbal bearing 28' and the second outer gimbal bearing 28" of the common gimbal holder and the first and the second opposite outer gimbal bearing 29', 29" of the single gimbal holder are also disclosed in FIG. 9.

FIG. 10 shows a side view of the mounting frame 390 together with its common gimbal holder 21 and its single gimbal holder 22 of the second embodiment in FIG. 3.

FIG. 11 shows a section B-B through the mounting frame 390 and the gimbal holders 21, 22 as indicated in FIG. 10. In this section it can clearly be seen that the rotational axis 32 of the common gimbal holder 21 is perpendicular or approximately perpendicular to the rotational axis 31 of the single gimbal holder 22. Disclosed are also the bearings 25', 25", 27', 27" for the inner gimbal rings of the common gimbal holder 21 and the bearings 26', 26", for the inner gimbal ring of the single gimbal holder 22. The first outer gimbal bearing 28' and the second outer gimbal bearing 28" of the common gimbal holder and the first and the second opposite outer gimbal bearings 39', 39" of the single gimbal holder are also disclosed in FIG. 11. Both these two outer gimbal bearings 39', 39" are located in the mounting frame 390.

FIG. 12 shows a side view of the mounting frame 490 together with its common gimbal holder 21 and its single gimbal holder 22 of a first alternative arrangement of the third embodiment in FIG. 4.

FIG. 13 shows a section C-C through the mounting frame 490 and the gimbal holders 21, 22 as indicated in FIG. 12. In this section it can clearly be seen that the rotational axis 32 of the common gimbal holder 21 is perpendicular or approximately perpendicular to the rotational axis 31 of the single gimbal holder 22. Disclosed are also the corresponding bearings 25', 25", 27', 27" for the inner gimbal rings of the common gimbal holder 21 and the bearings 26', 26", for the inner gimbal ring of the single gimbal holder 22. The first outer gimbal bearing 28' and the second outer gimbal bearing 28" of the common gimbal holder and the first and the second opposite outer gimbal bearings 39', 49' of the single gimbal holder are also disclosed in FIG. 13. The first of these two outer gimbal bearings 39' is located in the mounting frame 490 and the second of these two outer gimbal bearings 49' is located in the common gimbal holder 21 between on the one hand the first inner gimbal ring bearings 25', 25" and on the other hand the second inner gimbal ring bearings 27', 27". The distance between the said second outer gimbal bearing 49' and the first inner gimbal ring bearings 25', 25" is equal to the distance between the said second outer gimbal bearing 49' and the second inner gimbal ring bearings 27', 27".

The second outer gimbal bearing 49' is provided as a ball and joint bearing of which the ball 131 is located on the single gimbal holder 22 while a seat 132 for the ball 131 is located in the common gimbal holder 21. The ball 131 is fixed in the seat 132 by a locking ring 133.

FIG. 14 shows a side view of the mounting frame 490 together with its common gimbal holder 21 and its single gimbal holder 22 of a second alternative arrangement of the third embodiment in FIG. 4.

FIG. 15 shows a section D-D through the mounting frame 490 and the gimbal holders 21, 22 as indicated in FIG. 14. In this section it can also be seen that the rotational axis 32 of the common gimbal holder 21 is perpendicular or approximately perpendicular to the rotational axis 31 of the single gimbal holder 22. Disclosed are also the corresponding bearings 25', 25", 27', 27" for the inner gimbal rings of the common gimbal holder 21 and the bearings 26', 26", for the inner gimbal ring of the single gimbal holder 22. The first outer gimbal bearing 28' and the second outer gimbal bearing 28" of the common gimbal holder and the first and the second opposite outer gimbal bearings 39', 49" of the single gimbal holder are also disclosed in FIG. 15. The first of these two outer gimbal bearings 39' is located in the mounting frame 490 and the second of these two outer gimbal bearings 49" is located in the common gimbal holder 21 between on the one hand the first inner gimbal ring bearings 25', 25" and on the other hand the second inner gimbal ring bearings 27', 27". The distance between the said second outer gimbal bearing 49" and the first inner gimbal ring bearings 25', 25" is equal to the distance between the said second outer gimbal bearing 49" and the second inner gimbal ring bearings 27', 27".

The second outer gimbal bearing 49" is provided as a universal joint bearing having an outer joint bearing 151 fixedly mounted in the common gimbal holder 21 and an inner joint bearing 152 rotatable mounted around the rotational axis 32 in the outer joint bearing 151. In this inner joint bearing 152 the single gimbal holder 22 is mounted for rotation about its rotational axis 31. Thus, this universal joint bearing provides for an independent movement of the common gimbal holder 21 about its rotational axis 32 and for an independent movement of the single gimbal holder 22 about its rotational axis 31 while these gimbal holders still are connected to each other.

In all described embodiments it is understood that inner gimbal rings are to be rotatable mounted in each of the gimbal holders which gimbal rings are designed for internally supporting and guiding each of the movements of the setting devices and the reinforcing beams for example in accordance with the separate universal joints 3.1, 3.2, 3.3 disclosed in the prior art parallel-kinematical machine. It is also understood that each of the rotational axes of the inner gimbal rings is perpendicular to the respective rotational axis of the respective gimbal holders and also located in the same respective plane.

The invention claimed is:

1. A parallel-kinematical machine comprising:
    three setting devices, each of which can be lengthened and shortened individually to move a positioning head, which is attached to one end of each of the first, second and third setting devices, within a working range,
    each setting device being connected to a first, a second or a third respective inner gimbal ring of universal gimbal joints (UGJ),
    each inner gimbal ring being mounted in bearings for rotation in gimbal holders, which are rotationally mounted in outer gimbal bearings in an outer mounting,
    the first inner gimbal ring and the third inner gimbal ring being mounted for rotation in a common outer gimbal holder, which is mounted for rotation about a common gimbal axis,
    the second inner gimbal ring being mounted for rotation in a single gimbal holder, which is mounted in two opposite bearings for rotation about a second gimbal axis, which is not aligned with the common gimbal axis, and
    the common gimbal axis about which the common outer gimbal holder being either parallel or perpendicular to the second gimbal axis about which the single gimbal holder rotates.

2. The parallel-kinematical machine according to claim 1, wherein the second gimbal axis is oriented parallel or approximately parallel to the common gimbal axis.

3. The parallel-kinematical machine according to claim 1, wherein the second gimbal axis of the single gimbal holder is oriented perpendicular or approximately perpendicular to the common gimbal axis and at least one of the bearings of the single gimbal holder is located in the outer mounting.

4. The parallel-kinematical machine according to claim 3, wherein both bearings of the single outer gimbal holder are located in the outer mounting.

5. A parallel-kinematical machine comprising:
    three setting devices, each of which can be lengthened and shortened individually,
    each setting device in one end being connected to a positioning head via a first joint,
    each setting device being connected to respective one of a first inner gimbal ring, a second inner gimbal ring and a third inner gimbal ring of universal gimbal joints (UGJ),
    each inner gimbal ring being mounted in bearings for rotation in gimbal holders, which are rotationally mounted in outer gimbal bearings in an outer mounting,
    the positioning head being movable within a working range in response to manoeuvring of the setting devices, and
    at least two reinforcing beams, which are each connected to the positioning head via the first joint, each reinforcing beam having solely one degree of freedom,
    each reinforcing beam being adapted to slide longitudinally in a beam bearing in a respective one of the universal gimbal joints (UGJ), when one or more of the setting devices is/are lengthened or shortened,
    each beam bearing being connected to a gimbal holder, the beam bearing of at least one reinforcing beam being rotatable about an axis that extends parallel with the longitudinal axis of the reinforcing beam,
    the first inner gimbal ring and the third inner gimbal ring being mounted for rotation about a parallel axis in the respective gimbal holder,
    the first inner gimbal ring and the third inner gimbal ring being mounted for rotation in a common outer gimbal holder, which is mounted for rotation about a common gimbal axis,
    the second inner gimbal ring being mounted for rotation in a single gimbal holder, which is mounted in two opposite bearings for rotation about a second gimbal axis, which is not aligned with the common gimbal axis, and
    the common gimbal axis about which the common outer gimbal holder rotates is either parallel or perpendicular to the second gimbal axis about which the single gimbal holder rotates.

6. The parallel-kinematical machine according to claim 5, wherein each reinforcing beam has in a first direction a flexural rigidity which is considerably greater than its flexural rigidity in a direction at right angles to the first direction.

7. The parallel-kinematical machine according to claim 6, wherein each reinforcing beam has a generally rectangular cross-sectional shape.

8. The parallel-kinematical machine according to claim 5, wherein the second gimbal axis is oriented parallel or approximately parallel to the common gimbal axis.

9. The parallel-kinematical machine according to claim 5, wherein the second gimbal axis of the single gimbal holder is oriented perpendicular or approximately perpendicular to the common gimbal axis and at least one of the bearings of the single gimbal holder is located in the outer mounting.

10. A parallel-kinematical machine comprising:
    three setting devices, each of which can be lengthened and shortened individually to move within a working range a positioning head, which is attached to one end of each of the setting devices, each of the three setting devices being connected to a respective one of a first inner gimbal ring, a second inner gimbal ring and a third inner gimbal ring of universal gimbal joints (UGJ), each inner gimbal ring being mounted in bearings for rotation in respective gimbal holders, which are rotationally mounted in respective outer gimbal bearings in an outer mounting, the first inner gimbal ring and the third inner gimbal ring being mounted for rotation in a common outer gimbal holder, which is mounted for rotation about a common gimbal axis, the second inner gimbal ring being mounted for rotation in a single gimbal holder, which is mounted in two opposite bearings for rotation about a second gimbal axis, which is not aligned with the common gimbal axis, wherein the second gimbal axis of the single gimbal holder is oriented perpendicular or approximately perpendicular to the common gimbal axis and at least one of the bearings of the single gimbal holder is located in the outer mounting, and wherein one bearing of the single outer gimbal holder is located in the outer mounting and the other bearing of the single gimbal holder is located in the common gimbal holder at a location between the bearings of the first inner gimbal ring and the bearings of the third inner gimbal ring.

11. The parallel-kinematical machine according to claim 10, wherein the other bearing of the single gimbal holder is provided as a ball and joint bearing in the common gimbal holder.

12. The parallel-kinematical machine according to claim 10, wherein the other bearing of the single gimbal holder is provided as a universal joint bearing having an inner joint bearing and an outer joint bearing in the common gimbal holder so that the single gimbal holder is mounted to the common gimbal holder with two degrees of freedom between the holders.

13. A parallel-kinematical machine comprising:

a positioning head, first, second and third setting devices, each of which can be lengthened and shortened individually to move the positioning head within a working range, each of the first, second and third setting devices being connected at one end to the positioning head at first, second and third locations, respectively, each of the first, second and third setting devices being connected, respectively, to first, second and third inner gimbal rings of universal gimbal joints (UGJ), each inner gimbal rings being mounted in bearings for rotation in gimbal holders, which are rotationally mounted in outer gimbal bearings in an outer mounting, the first inner gimbal ring and the third inner gimbal ring being mounted for rotation in a common outer gimbal holder, which is mounted for rotation about a common gimbal axis, the second inner gimbal ring being mounted for rotation in a single gimbal holder, which is mounted in two opposite bearings for rotation about a second gimbal axis, which is not aligned with the common gimbal axis, and wherein the second gimbal axis is oriented parallel or approximately parallel to the common gimbal axis.

14. A parallel-kinematical machine comprising:

a positioning head, first, second and third setting devices, each of which can be lengthened and shortened individually to move the positioning head within a working range, each of the first, second and third setting devices being connected at one end to the positioning head at first, second and third locations, respectively, each of the first, second and third setting devices being connected, respectively, to first, second and third inner gimbal rings of universal gimbal joints (UGJ), each inner gimbal ring being mounted in bearings for rotation in gimbal holders, which are rotationally mounted in outer gimbal bearings in an outer mounting, the first inner gimbal ring and the third inner gimbal ring being mounted for rotation in a common outer gimbal holder, which is mounted for rotation about a common gimbal axis, the second inner gimbal ring being mounted for rotation in a single gimbal holder which is mounted in two opposite bearings for rotation about a second gimbal axis, which is not aligned with the common gimbal axis, and wherein the second gimbal axis of the single gimbal holder is oriented perpendicular or approximately perpendicular to the common gimbal axis and at least one of the bearings of the single gimbal holder is located in the outer mounting.

* * * * *